United States Patent [19]
Portman

[11] Patent Number: 5,461,968
[45] Date of Patent: Oct. 31, 1995

[54] BREWING POT

[76] Inventor: Jill Portman, 1783 Rosemary Rd., Highland Park, Ill. 60035

[21] Appl. No.: 300,437

[22] Filed: Sep. 2, 1994

[51] Int. Cl.[6] .................................................. A47J 31/06
[52] U.S. Cl. ................................. 99/287; 99/297; 99/299
[58] Field of Search ........................... 99/287, 297, 298, 99/299, 316, 317, 318, 319, 279, 321; 426/433; 210/350, 359, 464

[56] References Cited

U.S. PATENT DOCUMENTS

| | | |
|---|---|---|
| 90,790 | 6/1869 | Simpson . |
| 166,102 | 7/1875 | Hennaman et al. . |
| 198,686 | 12/1877 | Ropes . |
| 462,111 | 10/1891 | Cooper . |
| 607,409 | 7/1898 | Falardeau . |
| 1,847,879 | 3/1932 | Knecht ................................. 210/464 |
| 2,053,021 | 9/1936 | Cassol ................................. 99/287 |
| 2,192,836 | 3/1940 | Lewis . |
| 2,715,465 | 4/1952 | Wood . |
| 2,749,834 | 6/1956 | Hiscock ............................... 99/297 |
| 2,900,896 | 8/1959 | Bondanini ............................ 210/359 |
| 2,935,928 | 5/1960 | Keating ............................... 99/287 |
| 3,307,474 | 3/1967 | Kasher ................................. 99/287 |
| 3,927,608 | 12/1975 | Poyel ................................... 99/297 |
| 4,739,696 | 4/1988 | Sheen . |
| 4,864,921 | 9/1989 | Ross . |

Primary Examiner—Robert W. Jenkins

[57] ABSTRACT

An improved brewing pot is disclosed that allows the user to stop the brewing process at the point where the decoction is at the desired strength. In the preferred embodiment, the material from which a decoction is to be made is placed in a cylindrical chamber, boiling water is added, and then a circular screen carrying member, wherein the carried screen is exposed in pie shaped slots, is lowered into the chamber to approximately the level of the brewing liquid. When the brew has reached the desired strength, the screen carrying member is lowered into the liquid. The screen member is surrounded by a flexible gasket and the exposed portions of the screen itself are of sufficiently fine mesh so as to segregate the steeping material from the brewed or decanting area. The screen portions are then closed off, preventing fluid communication between the decanting chamber containing the finished brew, and the smaller area containing the brewed material, along with some amount of water. The closing off of the screen is preferably accomplished by an integral and rotatable overlay that corresponds in size to the exposed screen portions.

5 Claims, 2 Drawing Sheets

BREWING POT

BACKGROUND OF THE INVENTION

1. Field of the Invention

The present invention relates to liquid decoction. More specifically, it relates to a container in which the decoction takes place; and where the container has a means provided to, firstly, separate the material brewing in the liquid from the decanting spout or aperture, and second, to close off fluid communication between the decanting area and the decocted material when the desired decoction strength is reached or when a specified period of time has passed. The present invention is especially contemplated for use in brewing tea or coffee.

2. Description of the Prior Art

Tea is consumed by a large portion of the world's population: approximately one half, according to recent estimates. It is second in commercial importance only to coffee, this being because such a large amount of the product is consumed in the producing areas. Traditional tea is the top leaves and buds of the tea plant (*Camellia sinensis* of the family Theaceae) steeped in freshly boiling water for a period of about three to five minutes to extract the caffeine, tannin (for astringency), and the volatile oils that provide other aspects of the flavor. Much longer than this and the traditional brew will become overly bitter. Recently, herbal teas have become popular for those who wish to avoid the stimulating effects of caffeine, or who enjoy the flavor of the various herbs, or blends of herbs, popularized for this purpose. These herbal teas can also become overly bitter, overly strong, or the flavors can become imbalanced in a blend, due to the differing characteristics of the herbs involved if left steeping for too long a time. In the United States, in particular, tea bags made of porous paper have become almost universally used, having been introduced by New York merchant Thomas Sullivan, who provided his tea packaged in silk bags. Boiling water is poured over the tea bag, and the bag is removed from the water when the desired strength has been reached. The problem at this point is what to do with the sodden, dripping object. Traditional tea and many of the herbal blends can leave stains that are very difficult to remove in linen so that care must be taken is disposal of the used bag. Additionally, and possibly the primary reason that tea bags have never been popular in any part of the world other than the U.S., is that there is no graceful way to get rid of the tea bag. Squashing it with your fingers and propping the soggy crumpled result in your saucer is in no way genteel and would be looked upon in horror in many social situations, restaurants, and the like. This leaves the tea pot as the decoction means used in formal situations and among connoisseurs, along with those who prefer to make custom blends of herbs. The problem remains however, that too long a brewing time can mar the flavor. Thus, the instant invention seeks to obviate this problem by providing a brewing vessel where the brewing material is not only separated from the decanting portion or spout of the device by a screen, but also where the screen can be closed off, preventing fluid communication between the area of the vessel where the brewing material is segregated, and the greater decanting portion. This allows the user to control the strength of the decoction proximate the decanting portion, stopping the brewing process by preventing fluid communication between the two areas.

In a search at the U.S. Patent and Trademark Office a number of patents were uncovered that relate to the present invention and they are discussed hereinafter:

First is U.S. Pat. No. 90,790 issued on Jun. 1, 1869 to Samuel Simpson. This discloses a tea and coffee pot wherein the body of the pot is divided vertically into two portions by a partition, the lower portion of the partition being perforated to allow communication between the two areas. Unlike the present invention, however, there are no means shown to close off these perforations at a desired time.

Next is U.S. Pat. No. 166,102 issued on Jul. 27, 1875 to William H. Henneman et al. This discloses a boiling pot designed to be disposed within another pot for use, where a removable vertical partition includes a hinged cover to allow for the emptying of one or another of the discrete areas defined by the partition without the inadvertent emptying of the other. The entire outer wall of the pot is perforated, as is the partition. This is clearly different from the present invention, in that there is no way of closing off the perforations when desired.

U.S. Pat. No. 198,686 issued on Dec. 25, 1877 to Julius Ropes discloses a type case. This patent is of interest in that it shows two half-disk cover members that can be manipulated to either fully close the box, or allow any portion of the interior of the box to be exposed. Unlike the present invention though, these cover members do not overlay a screen or perforated sheet as would be required to keep the material being brewed in the instant invention from being inadvertently decanted.

Next is U.S. Pat. No. 462,111 issued on Oct. 27, 1891 to Silas G. Cooper. This discloses a sieve wherein a pair of screens, upper and lower, are disposed generally parallel to one another. The lower screen hangs down slightly in the center below the body of the device to form a strainer. A pair of oppositely disposed paddles are attached to a crank and are biased against the upper screen. Materials to be processed by the device are placed within the body thereof and the crank is turned. The articles are thus crushed while being forced through the upper screen and deposited on the lower, where the juice contained therein drips through into a container placed below the device. This is clearly unlike the instant invention, in that no means of closing off communication between any discrete areas are taught.

In U.S. Pat. No. 607,409 issued on Jul. 12, 1898 to Dennis L. Falardeau there is disclosed a combination kitchen utensil. In FIG. 7 of the disclosure, the cup portion of the device is shown being used for decoction purposes, however, in contrast to the present invention, as in the patents discussed above, there is no teaching of the closing off of the perforations in the cup portion to cease the brewing process.

U.S. Pat. No. 2,192,836 issued on Mar. 5, 1940 to Miles C. Thomas Lewis discloses a condiment shaker bottom. The body of the shaker is divided into two areas, and a pair of semicircular plates cover the bottoms of each of the areas. The covers are held in place by a helical spring attached to the interior of a cap that is threadably engageable with the body of the shaker. Contrast this to the present invention wherein a screen portion defining two discrete areas within the brewing chamber can be covered without the necessity of opening the apparatus.

U.S. Pat. No. 2,715,465 issued on Aug. 16, 1955 to Ira E. Wood discloses a beverage brewing crock. The body of the crock has an internal ledge to provide a sediment trap in the interior's bottom. A trap cover is sized such that it rests on the ledge when lowered into the container. The cover includes circumferentially spaced notches to decrease the likelihood of disturbing the sediment as the cover is lowered into place.

In U.S. Pat. No. 4,739,696 issued on Apr. 26, 1988 to Shuenn T. Sheen there is disclosed a separative tea brewing apparatus. This has an upper and a lower container, with the upper, brewing container resting on, and partially within, the lower, decanting container. The upper container includes a screen disposed above the bottom wall. The bottom wall is funnel shaped and has a drainage hole in the center. A steel ball covers this hole and is attached by a wire to another ball located exteriorly. After the tea has been sufficiently brewed, the exterior ball is pulled, opening the hole and allowing the tea to drain into the lower container. Unlike the present invention, the Sheen patent teaches two separate containers, removable from one another, whereas the instant invention has a single chamber. This feature will decrease the chance of breakage and aids in cleaning the unit.

Lastly, U.S. Pat. No. 4,864,921 issued on Sep. 12, 1989 to Gary Ross discloses a combination mug with an integral tea bag receptacle. The internal liquid retaining chamber of the apparatus is in fluid communication with an interior chamber of a tea bag receptacle. The opening of the receptacle proximate the internal liquid retaining chamber is just slightly wider than a standard tea bag and the upper and lower walls slope inwards to assist in squeezing the liquid out of the tea bag as it is pulled into the receptacle. There is a slot above the receptacle extending radially inwardly to communicate with the top opening of the liquid retaining chamber to allow the string of the tea bag to extend therethrough. This is clearly dissimilar from the instant invention, as no screen to provide a brewing area is taught in the patent.

None of the above inventions and patents, taken either singly or in combination, is seen to describe the instant invention as claimed.

SUMMARY OF THE INVENTION

The present invention is an improved brewing pot that allows the user to stop the brewing process at the point where the decoction is at the desired strength. In the preferred embodiment, the material from which a decoction is to be made is placed in a cylindrical chamber, boiling water is added, and then a circular screen carrying member, wherein the carried screen is exposed in pie shaped slots, is lowered into the chamber to approximately the level of the brewing liquid. When the brew has reached the desired strength, the screen carrying member is lowered into the liquid. The screen member is surrounded by a flexible gasket and the exposed portions of the screen itself are of sufficiently fine mesh so as to segregate the steeping material from the brewed or decanting area. The screen portions are then closed off, preventing fluid communication between the decanting chamber containing the finished brew, and the smaller area containing the brewed material, along with some amount of water. The closing off of the screen is preferably accomplished by an integral and rotatable overlay that corresponds in size to the exposed screen portions.

Accordingly, it is a major goal of the invention to provide an improved brewing pot that overcomes the disadvantages of the prior art.

It is a major object of the invention to provide an improved brewing pot where the user can segregate the material being brewed from the portion ready to be decanted.

It is another object of the invention to provide an improved brewing pot where the user can stop the brewing process at a desired point by preventing fluid communication between the area holding the segregated material and the portion ready to be decanted.

It is a further object of the invention to provide an improved brewing pot wherein the prevention of fluid communication is accomplished by a pair of similarly sized overlying members integral with and proximate to a segregating screen and to each other, and where at least one of the overlying members is rotatable in relation to the other about a central point.

It is an object of the invention to provide improved elements and arrangements thereof in an apparatus for the purposes described which is inexpensive, dependable and fully effective in accomplishing its intended purposes.

The present invention meets or exceeds all the above objects and goals. Upon further study of the specification and appended claims, further objects and advantages of this invention will become apparent to those skilled in the art.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
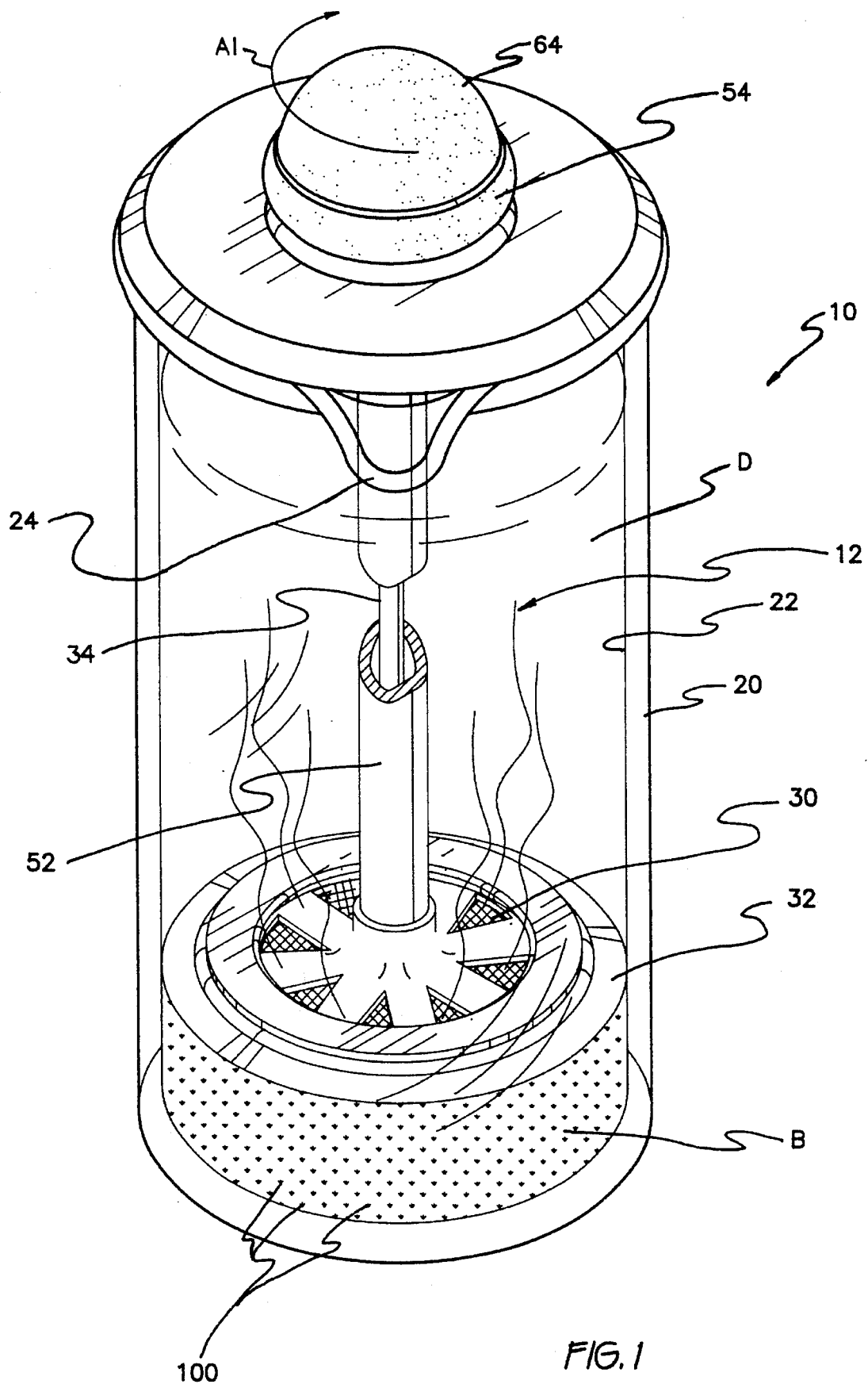
FIG. 1 is a perspective view of an embodiment according to the invention showing material being brewed therein.

An embodiment according to the invention is indicated generally at 10 in FIG. 1. The plunger portion 12 is extended fully downwards into the interior 22 of the pot 20. In the preferred embodiment shown herein, this pot 20 is cylindrical though other shapes could be used: for example the shapes could be oblong, a square, or even polygonal in cross-section. The pot 20 has a decanting spout 24 located at one point along its upper periphery 26, this periphery 26 defining an opening 28. With the plunger portion 12 thus extended downwardly into the pot 20, the screen carrying member 30 and its surrounding gasket 32 (both best seen in FIG. 2) serve to define two areas: the decanting area D and the brewing area B. The segregated pieces of the material being brewed are indicated at 100 in FIG. 1.

Figure 2:
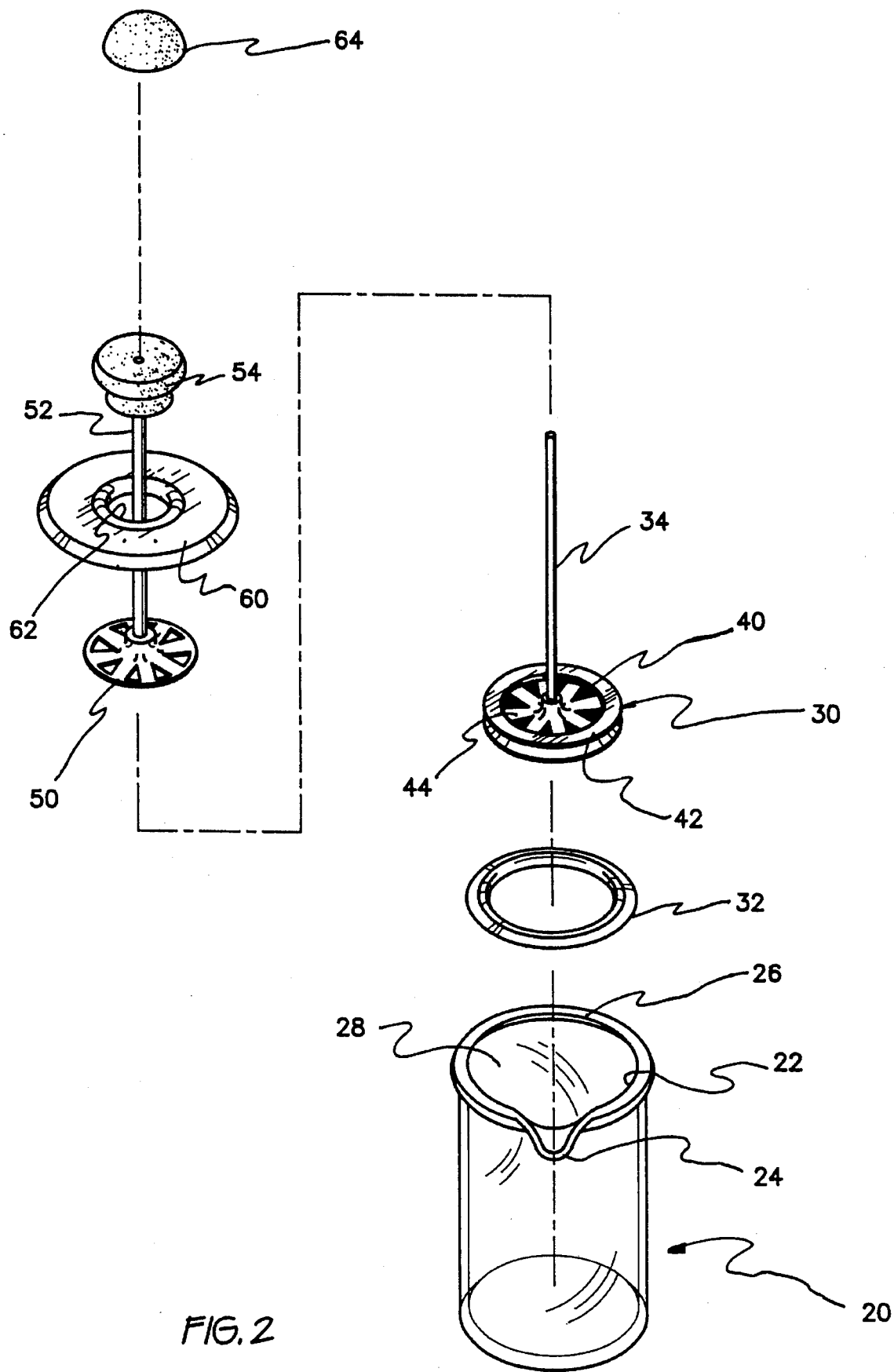
FIG. 2 is an exploded view of the embodiment of FIG. 1, showing the various parts and their relationship to one another.

Referring now to FIG. 2, the various components of the instant invention will now be addressed. The pot 20, as mentioned above, is preferably cylindrical. It could be made of a tempered glass, ceramic, or other material. For ease of use, the pot 20 could include an integral handle (not shown), or it could be placed in a heat resistant receiver (also not shown) that would itself include a handle. The screen carrying member 30, with the surrounding gasket 32 also includes a central shaft 34. The screen carrying member has contained in it a screen 40, a surrounding peripheral flange 42, and a first overlying member 44. In the preferred embodiment described herein, this first overlying member 44 covers the screen 40 such that the portions of the screen 40 that are thus exposed describe pie-like wedges, in this embodiment numbering eight. It is, of course, obvious that a wide range of shapes could be defined by the first overlying member 44. Circles, squares, or irregular polygons could be utilized. Additionally, the number of exposed wedges could be varied without parting from the spirit of the invention.

The second overlying member 50 is connected by a hollow tube member 52 to an adjustment handle 54. These three elements 50, 52, and 54 comprise the shutoff stem portion of the present invention. The second overlying member 50 is dimensioned such that it fits precisely within the surrounding peripheral flange 42. The second overlying member 50 could either fit into a notch therein (not shown), thus making second member 50 substantially integral with screen carrying member 30, and rotatable therein, or the elements 50, 52, 54 comprising the shutoff stem could be separate. The hollow tube member 52 is placed over rod 34 to engage member 50 with peripheral flange 42 as seen in FIG. 1. When the plunger portion 12 is put together, a fixed cap 64 is placed upon the top of the central shaft 34. The fixed cap 64 rests on top of the adjustment handle 54.

Thus, in use, the material to be brewed, whether traditional tea, an herbal blend, coffee, or other substance is placed in the interior 22 of the pot 20. Boiling water is then added. Plunger portion 12, along with cover 60 is then placed over opening 28 of pot 20 to approximately the level of the brewing liquid. When the liquid has reached the desired strength, screen carrying member 30, along with overlying members 44, 50, and gasket 32 are lowered into the pot 20 as shown in FIG. 1. At this point first and second overlying members 44 and 50 are substantially in alignment with one another to allow fluid communication between areas B and D through the screen 40 at its exposed portions. Adjustment handle 54 is then rotated in the direction indicated by arrow A1, and thus moves the second overlying member 50 to cover the exposed areas of the screen 40, preventing fluid communication between the areas D and B. Thus, the strength of the brewed liquid in the decanting area D remains constant.

It is to be understood that the present invention is not limited to the sole embodiment described above, but encompasses any and all embodiments within the scope of the following claims.

I claim:

1. An improved pot for brewing comprising:

a brewing pot, including side walls, a bottom, and an opening, said pot having an interior defined by said walls, bottom, and opening;

a screen carrying member having an outer periphery, a screen, and a first screen overlay lying substantially parallel to and proximate said screen, said outer periphery dimensioned to fit snugly within said interior of said pot such that said screen carrying member defines and separates an upper interior portion and a lower interior portion of said pot interior when placed therein;

a second overlay rotatable in relation to said first overlay, said second overlay lying substantially parallel to and proximate said first overlay; and a cover, including a screen carrying member attachment shaft connected to said screen carrying member fixing said screen carrying member substantially in relation to said cover, and an adjustment shaft attached to said second overlay, said adjustment shaft being attached to an adjustment handle;

wherein said first and said second overlays are positioned in a first position wherein fluid communication exists between said upper interior portion and said lower interior portion of said pot interior through said first and second overlays and, further, where said first and said second overlays are positioned in a second position no fluid communication exists between said upper interior portion and said lower interior portion of said pot interior.

2. The improved pot for brewing according to claim 1, wherein said side walls, said opening means, and said bottom generally define a cylinder.

3. The improved pot for brewing according to claim 1, wherein said adjustment shaft comprises a hollow tube member.

4. The improved pot for brewing according to claim 3, wherein said adjustment handle is a knob attached to said hollow tube member, said knob being rotatable about said screen carrying member attachment shaft.

5. The improved pot for brewing according to claim 1 wherein said outer periphery of said screen carrying member includes a surrounding gasket separate from said first overlay.

* * * * *